United States Patent [19]

Panigraphy et al.

[11] Patent Number: 5,294,250
[45] Date of Patent: Mar. 15, 1994

[54] SELF-FLUXING BINDER COMPOSITION FOR USE IN THE PELLETIZATION OF ORE CONCENTRATES

[75] Inventors: Sarat C. Panigraphy, La Prairie; Pierre Legast, Sherbrooke; Normand Lesmerises, Rock Forest, all of Canada

[73] Assignee: Ceram Sna Inc., Sherbrooke, Canada

[21] Appl. No.: 844,281

[22] Filed: Mar. 2, 1992

[51] Int. Cl.$^5$ .................. C04B 35/04; C04B 35/06; C04B 35/02; C09D 103/02; C09D 105/00

[52] U.S. Cl. .................. 106/217; 106/209; 106/214; 501/108; 501/112; 501/122; 501/123; 75/772

[58] Field of Search .................. 106/209, 217, 214; 501/122, 108, 112, 123; 75/772

[56] References Cited

U.S. PATENT DOCUMENTS

| | | | |
|---|---|---|---|
| 3,644,113 | 2/1972 | Lang et al. | 75/772 |
| 4,288,245 | 9/1981 | Roorda et al. | 75/0.5 R |
| 4,597,797 | 7/1986 | Roorda et al. | 106/194 |
| 4,767,449 | 8/1988 | Rosen et al. | 75/772 |
| 4,863,512 | 9/1989 | Banyai et al. | 75/5 |
| 4,948,430 | 8/1990 | Banyai et al. | 75/321 |
| 4,985,164 | 1/1991 | Delvaux et al. | 252/62 |
| 5,000,783 | 3/1991 | Dingeman et al. | 75/772 |

OTHER PUBLICATIONS

Larry A. Haas et al., "Effectiveness of Organic Binders for Iron Ore Pelletization," Bureau of Mines, U.S. Department of the Interior, Report of Investigations 1989.

*Primary Examiner*—David Brunsman
*Attorney, Agent, or Firm*—Foley & Lardner

[57] ABSTRACT

A self-fluxing binder composition for use in the pelletization of an ore concentrate, especially iron ore concentrates. The composition comprises from 50 to 98% by weight of one or more carrier having a high surface area, and from 2 to 50% by weight of a water soluble organic enhancer. The carrier is selected from the group consisting of natural and synthetic magnesium and/or calcium bearing minerals and preferably consists of synthetic, fibrous-like forsterite. The enhancer is selected amongst the natural polysaccharides, of high viscosity, and more preferably amongst the natural gums of high viscosity such as the guar or xanthan gum and amongst starch and is derivatives. The use of such a self-fluxing binder composition improves the properties of the green and dry pellets and makes them more easy to handle, as compared to those produced with other conventional binders. Moreover, the pellets that are produced with such a binder composition have improved metallurgical properties.

4 Claims, No Drawings

SELF-FLUXING BINDER COMPOSITION FOR USE IN THE PELLETIZATION OF ORE CONCENTRATES

BACKGROUND OF THE INVENTION a) Field of the Invention

The present invention is concerned with a self-fluxing binder composition for use in the pelletization of ore concentrates, preferably iron ore concentrates.

The invention is also concerned with the green, dry or fired ore concentrate pellets produced with such a self-fluxing binder composition.

b) Brief Description of the Prior Art

With the depletion of high quality natural metallic ores, most of the ores which are presently extracted, are usually subjected to significant size reduction and subsequent upgrading by mineral beneficiation process prior to being used. The upgraded metallic ores that are so obtained, are usually in the form of very fine particles or may be ground as such to make them amenable to a technique called "agglomeration", which also has been successfully applied in a wide variety of industries such as fertilizer, chemicals, nonmetallic minerals, industrial wastes etc. . . . As a matter of fact, agglomeration is the most important technique applied for the treatment of fine iron ore concentrates, which otherwise cannot be easily handled, shipped or charged to a blast furnace or for the production of direct reduced iron.

Although agglomeration can be achieved in many ways, sintering, pelletizing and, to a lesser extent, briquetting are the most important agglomeration processes. While sintering requires relatively coarse particles (lower than 0.2 mm), pelletizing can generally be achieved with particles lower than 0.2 mm, and preferably finer.

Pelletizing is a well known process which comprises essentially two basic operations:

1) preparation of green balls or pellets, and
2) firing of the green pellets through a number of successive steps including drying, preheating and firing.

The preparation of good quality green pellets is a prerequisite for the production of high quality fired pellets. Indeed, the green pellets must have adequate strength properties and impact resistance to withstand handling, resistance to a number of drops, drying and eventually firing in the subsequent stage.

To achieve such a goal, it is of conventional practice to add a binder to the ore concentrate prior to its pelletization in order to ensure that the produced green and dry pellets have adequate strength properties for subsequent handling, transportation and heat hardening treatment. Binders are known to affect both physical and metallurgical quality of the pellets. Accordingly, any binder to be actually useful, must ensure adequate performance during the formation of the green pellets and during their firing, and also impart good pellet properties.

So far, bentonite, which is an aluminum silicate clay, has commonly been used as a binder. Bentonite forms permanent bridges between iron oxide grains during firing blocking access to internal pore structure. Its composition may substantially vary from one extraction site to another and its use contributes to a significant increase in the gangue content of the pellets because of its high concentration of silica and alumina.

Pellets, especially iron ore pellets, produced with use of bentonite as a binder, usually require additional basic fluxes containing CaO and MgO when they are produced or during their use, i.e. when they are fed into a blast furnace, to meet some standard metallugical requirements as well for production of metal of good quality. Thus, the addition of extra fluxing materials contributes to the production of higher slag volume in the blast furnace, requiring extra energy that adds to the operating cost of the blast furnace Therefore, considerable efforts have been made in the past and are presently being pursued to reduce the bentonite consumption in pelletizing or to find a substitute for it.

Peridur ®, a dry cellulose based organic binder (U.S. Pat. Nos. 4,288,245 and 4,597,797) has been proposed as such a substitute. Although Peridur ® is efficient, its high cost and certain deterioration noticed in the metallurgical qualities of the pellets produced with it, has restricted so far its use in a great majority of the pelletizing plants As a matter of fact, despite the fact that bentonite has several disadvantage, no other binder has been found so far to replace it. Moreover, because it has almost exclusively been the only binder used during the entire growth span of the pelletizing industry, bentonite has created certain standards in the iron ore pelletizing industry. Therefore, any new binder to be accepted must meet these standards, in addition to providing the pellets with the basic strength properties required for transportation, storage and mixing procedures. Above all, any new binder to be accepted must be both energy and cost efficient. Any new binder to be accepted should also address a number of important issues imposed by environmental protection agencies. Moreover, large scale production of such a binder had to be both economically and technically feasible over a period of time.

Peridur ® and other similar type of organic binders like those disclosed in U.S. Pat. Nos. 4,863,512 and 4,948,430, although they reduce the chemical "contamination" of the ore concentrate with unwanted elements do not address alone all the requirements of pellet quality. In order to meet these pellet quality requirements, additional materials, especially basic fluxing materials, must be added to the concentrate. It is essentially because of the above limiting factors and because of their high cost that the use of such substitute binders have severely been restricted in a large majority of pelletizing plants.

OBJECTS OF THE INVENTION

A main object of the present invention is to provide a new kind of binder composition for use as a substitute for bentonite in the pelletization of ore concentrates.

More particularly, the main object of the invention is to provide a self-fluxing binder composition which is not only useful as a binder to reinforce the agglomeration of the ore particles, but which also incorporates a synthetic or natural magnesium or calcium bearing mineral, like those that are invariably added as fluxing materials in finely ground form to the green pellet mix prior to green pellet formation, or in lumpy form in the blast furnace along with the pellets and other blast furnace burden materials.

Another object of the invention is to provide a green, dry or fired ore concentrate pellet, comprising from 0.1 to 5.0%, preferably 0.1 to 2.0% by weight of such a self-fluxing binder composition.

SUMMARY OF THE INVENTION

In accordance with the present invention, there is provided a self-fluxing binder composition for use in the pelletization of an ore concentrate, which comprises a mixture of:

from 50 to 98%, and preferably from 70 to 98% by weight of at least one fluxing material hereinafter called "carrier" which has a high surface area and is selected from the group consisting of natural and synthetic magnesium and/or calcium bearing minerals; and from 2 to 50%, and preferably from 2 to 30% by weight of at least one water soluble organic substance hereinafter called "enhancer", selected amongst the natural polysaccharides of high viscosity, said enhancer being preferably selected from the group consisting of natural gums of high viscosity such as guar, xanthan, agar, arabic and tragacanth gum; starch and its derivatives, pectine and its derivatives and carrageenan.

When the ore concentrate is a metal containing ore concentrate, the carrier that is used in the composition is preferably selected from the group consisting of synthetically produced, fibrous-like foresterite and finely ground, natural calcium bearing minerals such as calcite (limestone), natural magnesium-bearing minerals such as olivine or magnesite, and natural calcium and magnesium-bearing minerals such as dolomite.

GENERAL DESCRIPTION OF THE INVENTION

In accordance with a very important aspect of the invention, the carrier that is used in the composition must have a high surface area. Accordingly, use is preferably made of synthetic fibrous-like forsterite (see U.S. Pat. No. 4,985,164) which has a very high surface area of 15 to 20 m$^2$/g, or of finely ground, natural minerals such as olivine, magnesite, dolomite and calcite.

In accordance with another very important aspect of the invention, the binding properties of the binder composition is enhanced by a small amount of an enhancer of the polysaccharide type having a high viscosity, including natural gums such as guar, xanthan, agar, arabic and tragacanth gums, and other natural polysaccharides of high viscosity, such as starch and its derivatives, pectine and its derivatives and carrageenan.

It has surprisingly been found that the combination of such a high surface area carrier with such an enhancer unexpectedly improves the mechanical properties of the green pellets that are prepared, as well as the properties of the pellets that are finally obtained through the successive steps of drying, preheating and firing.

It has also surprisingly been found that with such a combination, the amount of binder that is usually required to prepare green pellets is substantially reduced, thereby reducing to the same extent the amount of undesirable compounds or elements necessarily added to the pellets by the incorporation thereto of a binder (by way of example, bentonite contains up to 80% by weight of silica and alimina that are usually unwanted and have to be removed as slag during the extraction of iron in the blast furnace).

All of these advantages cannot be derived from each of the components of the self-fluxing binder composition according to the invention, when taken alone. Indeed, none would have expected to obtain "good" pellets using natural gum as a binder, in an amount much less than usual (see the article of Larry A. HAAS et al, "Effectiveness of organic binders for iron ore pelletization", Report of investigations 9230, U.S. Bureau of Mines, 1988). None would also have expected the synergistic effect of the combination disclosed hereinabove and its profound and favourable effect on the agglomerates formed, which quite surprisingly and unexpectedly improves both the mechanical and metallurgical properties of the fired pellets.

The amount of self-fluxing binder composition according to the invention to be added to the ore concentrate to achieve proper results depends on the nature of ore concentrate to be agglomerated, the method of agglomeration that is selected, the type of agglomeration and the desired properties of green (wet), dried and fired pellets. As an example, it has been found that iron ore pellets may be formed with adequate to excellent green, dry and fired properties, if the amount of binder composition added to the iron ore mix is in the range of 0.4-2% by weight. In other type of metallic or nonmetallic ore mix, this amount may vary from 0.1 to 5.0% by weight depending on the desired properties of the agglomerates. In this connection, any person skilled in the art may easily establish what amount of binder composition would be required to obtain optimum results The addition of the binder composition according to the invention may be carried out in any manner known per se in this field. The binder composition can be mixed as such, i.e. in solid form, or in the form of a water slurry if required.

As aforesaid, the binder composition preferably comprises a carrier consisting of a synthetically produced forsterite having a high surface area (15-20 m$^2$/g) or of very finely ground natural magnesium and calcium minerals such as olivine, magnesite, dolomite or calcite (e.g. 80%-325 mesh or coarser/finer depending on the nature of the concentrate) in a percentage ranging from 50-98% by weight. More preferably, use can be made of 70 to 98% by weight of carrier(s).

The self-fluxing binder composition according to the invention can be used either alone or in combination with some other known binder, such as bentonite. However, this is not a preferred route since such a combination although it may appear to be good during green balling, has the drawback of producing fired pellets that contain too much unwanted contaminants such as silica and alumina, thereby loosing some of the advantages of metallurgical properties obtained by using the binder composition according to the invention.

The self-fluxing binder according to the invention can be used with almost all types or iron-containing ores ore concentrates, such as hematite, magnetite, mixtures of hematite and magnetite concentrates, natural ores and the like. The self-fluxing binder according to the invention can also be used with other metallic and nonmetallic ores.

The iron ore concentrate is generally in the form of filter cake which retains certain amount of water (8-10%) after wet grinding and filtration. In some instances, the concentrate may be dry ground and eventually wetted prior to green balling. Irrespective of the method of grinding, the concentrate has to be thoroughly mixed with the binder composition with or without additional water, prior to being poured and rolled in a drum or disc to obtain the desired green balls of specific sizes, the preferred size being usually 9-16 mm, that may then be subjected to drying and firing.

The drying and firing can be accomplished in a single step or in two separate steps, as is well known in the art.

The firing is generally carried out in the temperature ranging from 1250 to 1320° C., although the temperature may occasionally exceed this range. Firing which is often referred to as "induration" or "heat hardening" is carried out for a sufficient period of time to develop adequate bonding between the various pellet constituents to make the resulting pellets capable of being shipped and handled at the producing and consuming ends.

The importance of the present invention lies not only in the resultant superior mechanical properties of the green and dry pellets that are obtained with the self-fluxing binder composition disclosed hereinabove but also and most importantly, in both the mechanical and metallurgical properties of the final product, i.e. the fired pellets The invention and its advantages will be better understood upon reading the following non restrictive examples.

CHARACTERIZATION OF THE PELLET PROPERTIES

In the following examples, the properties of the pellets at the green, dry and fired stage that were measured on the tested products because they are considered to be of practical importance for pellet characterization, are as follows.

DROP NUMBER

The drop number is an important qualitative indicator of the resistnace of the green pellets to fracture by impact without undue permanent deformation Normally pellets with at least 7 to 15 or higher drops from a height of 45 cm onto a hard smooth surface without revealing any cracks or breaking are considered good pellets Such pellets would have the ability to withstand handling during transportation.

WET COMPRESSION STRENGTH

This test is used to determine whether the green pellets have sufficient strength to withstand compressive forces encountered during conveying, transportation and screening for the subsequent drying and firing operation. The testing is normally accomplished in a hydraulic press or a mechanical device The wet compressive strength is the maximum load a green pellet can withstand. In general, an acceptable wet compression strength is in the range of 1-1.5 Kg/pellet or higher.

DRY COMPRESSION STRENGTH

The pellet dry compression strength is a very important criteria as the pellets become brittle and are prone to brittle fracture following loss of free water. As in the green compression strength, the dry strength of pellets are determined. When the pellets have more than 2.5 Kg per pellet, the dry strength is considered to be good.

THERMAL SHOCK RESISTANCE TEST

This test measures the behavior of green pellets when subjected to abrupt increase in the temperature. In this test about 10-20 green pellets are placed in a muffle furnace which is preheated to the specific temperature, the temperature range being generally 300°-900° C. After 15 minutes, the percentage of pellets disintegrated is determined.

FIRED COMPRESSION STRENGTH

The fired compression strength is the maximum load a fired pellet can withstand. As in the case of green and dry compression strength, it is determined by loading the pellet to breakage in a hydraulic press or mechanical

TUMBLER STRENGTH

In addition to compression testing, the resistance of the pellet to breakage and dusting caused by abrasion during transportation and handling from the source, shipping as well as handling at the consumers end, are also important pellet characteristics. Measurement of this resistance is carried out by tumbling a specified amount of pellets in a drum for a prescribed period of time. The procedure by ASTM or ISO are generally used to determine the tumbler strength.

LOW-TEMPERATURE DISINTEGRATION (LTD)

The low-temperature disintegration is a measure of resistance to disintegration under mildly reducing conditions simulating those in the upper stack of the blast furnace. The ISO static or dynamic test procedures are generally adopted for the determination of LTD.

REDUCIBILITY

Gas reducibility, i.e. the capacity to remove oxygen in the blast furnace stack by means of the ascending gases, is an important parameter affecting the efficiency of the ironmaking process as reflected by the coke rate and the rate at which iron can be produced. A highly reducible burden implies a faster driving and shorter residence time in the stack and higher productivity of the furance. The ISO reducibility method is generally used to determine the rate of reduction $(dR/dt)_{40}$ in % per minute.

SWELLING

With the reducing conditions existing in the blast furnace the pellets undergo certain amount of swelling. Sometimes, the swelling may be so high that it may severely affect the permeability of the burden. A maximum allowable swelling for pellets is considered to be 20%, although lower swelling values are preferable.

Table I hereinafter gives the values that fired pellet should meet according to some authors.

TABLE I

| PELLET SPECIFICATIONS TO BE MET | |
|---|---|
| TEST | SUGGESTED VALUE |
| Size range | minimum 85%, +9 mm–16 mm |
| Compression strength | minimum 200 kg/pellet |
| ASTM index | minimum 94%, +6.3 mm |
|  | maximum 5%, −500 μm |
| Reducibility | 0.65% O/min |
| (dR/dt 40%) |  |
| LTD | minimum 80%, +6.3 mm |
|  | maximum 7.5%, −500 μm |
| Swelling | maximum 20% |

Traice, F. B. and Lappin R. L. "Development and in ironmaking practice, proc. conf. 22-23, Nov. 1972, Iron Steel Ins.) London p. 17–31;

Biswas A. K. "Principles of blast furnace iron making", Cootha publishing house, Brisbane Australia, 1981, p. 206.

FORMULATION OF THE BINDER COMPOSITIONS

To carry out the following examples and make the comparative tests reported therein, a plurality of binder compositions were prepared, which were designated as "A", "B", "C", "D", "E" & "F". Composition "A" consisted of synthetic forsterite exclusively. Accordingly, composition "A" contained 100% carrier and 0% enhancer. Composition "B" consisted of a complex polysaccharide, namely guar gum, exclusively. Accordingly, composition "B" contained 0% carrier and 100% organic enhancer.

Composition "C" was a mixture of a finely ground calcium bearing mineral, namely calcite, with a complex polysaccharide, namely guar gum, in a proportion of 85:15.

Composition "D" was a mixture of a finely ground magnesium-bearing, namely dolomite, with a complex polysaccharide, namely guar gum in a proportion of 85:15.

Compositions "E" and "F" were mixtures of synthetic forsterite with a complex polysaccharide, namely guar gum, in proportions of 90:10 and 85:15 respectively.

As may be understood, compositions "C", "D", "E" and "F" are compositions according to the invention.

In the following examples, the results obtained with the above typical binder compositions are given. In some examples these results are also compared with those obtained with bentonite and/or with another commercial organic binder, namely Peridur 230 ®.

All parts and percentages given hereinabove as well as in the examples, are in weight unless otherwise stated.

EXAMPLE 1

In this example, the effect of various binder compositions according to the invention on the properties of the green pellets and on the compression strength of the fired pellets is illustrated.

A typical Quebec North Shore and Labrador specular hematite concentrate containing approximately 16.5% magnetite in the form of a filter cake with 8.5% $H_2O$ was used as starting material. The chemical analysis of the filter cake was 65.9% Fe, 4.8% $SiO_2$, 0.38% CaO and 0.26% MgO on dry basis. It also contained 0.65% carbon, which is a standard practice at most of the Quebec and labrador operations as an energy saving measure. The filter cake had a Blain number of 1515 $cm^2/g$.

The above filter cake in 10 kg batches was mixed with a predetermined quantity of dry binder composition in a Hobart ® mixer (model A200) for 3 mins. For each experimental condition, four such batches were prepared. The green balling was carried out in a 1 meter balling disc rotating at 18 rpm at a vertical angle of 37°. The green balling was carried out as follows:

1. 5 kg of the prepared feed was charged into the rotating balling disc.
2. Adequate quantity of water was sprayed onto the feed for the formation of seed pellets of about 6 mesh (3.36 mm) size.
3. Fresh feed is then hand fed by breaking the lumpy material onto the seeds. From time to time, water spray was opened for proper growth of these pellets until a majority of the pellets reach a size of ⅜" (9.5 mm).
4. If excessive amount of seed pellets was still present, part of these seeds were removed. This was quite easy since the balls get naturally classified in the disc with the large balls tending to concentrate at lower center region of the disc. Fresh feed was introduced so that the balls grow further. After a sufficient number of pellets reached a size of ≧12 mm, these pellets wee screened out using a ½" screen and collected. The undersize materials are recycled back into the disc.
5. The above process was continued until all the feed material was consumed.
6. In this way approximatly 85-90% balls fell into the desired size range of 9.5-16.0 mm. The green balling generally took 40-50 minutes for completion.

Approximately 200 green pellets in the size range of 12-13 mm were collected and set aside in a air tight container for determination of green pellet quality, shock resistance, etc. Out of this sample, approximately 50 pellets were dried overnight in an oven heated at 105° C. Following cooling to room temperature, the dry compression strength was determined. The green pellet moisture was calculated from the difference in weight of green and dry pellets.

After screening the green balls in the desired size range (9.5-16 mm), approximately 10 kg of pellets were dried in an oven at 105° C. About 6 kg of dried pellets were collected and placed in 1 kg batches in 6 graphite crucibles for each test condition. Two batches of pellets (2 kg) were fired at three different temperatures, viz. 1250, 1275 and 1300° C. The pellets were fired in a muffle furnace which was programmed to reach the required firing-temperature. At the specific firing temperature, the pellets were indurated for 15 mins. The power was then turned off and the pellets were cooled in the furance by opening the muffle furnace door slightly.

Corresponding to each temperature of firing, 20 pellets in a close size range of 12-13 mm were tested on a Instron ® machine by following ISO compression strength test procedure (ISO/4700, 1983).

The results are summarized in Table II.

TABLE II

| Binder type | % Addition | GREEN BALL PROPERTIES | | | Dry compr. kg/p | Fired compr. kg/p | % Survival at 900° C. |
|---|---|---|---|---|---|---|---|
| | | % pellet moisture | Drop number | Green compr. kg/p | | | |
| A | 1.00 | 7.8 | 3.3 | 0.6 | 0.8 | 372 | 100 |
| B | 0.10 | 9.5 | 11.0 | 1.1 | 2.3 | 242 | 60 |
| E | 1.00 | 9.3 | 18.0 | 1.0 | 2.8 | 327 | 100 |
| F | 0.75 | 9.5 | 31.6 | 1.3 | 4.3 | 286 | 100 |
| F | 1.00 | 9.3 | 39.4 | 1.5 | 7.9 | 311 | 100 |
| PERIDUR (230) | 0.10 | 7.5 | 7.0 | 0.8 | 1.8 | 238 | 100 |

It is seen from the results reported ino Table II that the binder composition A (synthetic forsterite alone) do not possess the required green ball properties, but the fired strength value is excellent.

On the other hand, the pellets produced with the binder composition "B" (a natural polysaccharide alone) made the green balls very plastic, and the green balls clumped together making it difficult for handling. The green ball growth was very slow resulting in decreased production rate of the balling device. Although the green ball and dry strength values appeared to be reasonably good, the pellets had poor shock resistance, as the established bonds disappeared to a greater extent at lower temperatures. Also these pellets required higher induration temperature for pellet strenghtening and showed large variation in pellet strength values.

It is however seen from Table II that if synthetic forsterite acting as carrier is mixed with a small percentage of natural polysaccharide acting as enhancer (compositions E and F), the drop number, green and dry compression, shock resistance and fired compression improve considerably. If either the carrier or the enhancer is used alone, these improvements cannot be realized.

Thus, the binder composition according the invention has a synergistic effect on the pellet quality.

Table II also shows that the pellets produced with commercially available Peridur ® had inferior green and fired pellet quality as compared to produced with the compositions E and F.

EXAMPLE 2

This example is intended to show the effect of some of the binder compositions of example 1 and of some other binder compositions containing finely ground natural magnesium and calcium bearing minerals on the green ball properties and fired compression strength of pellets produced from fluxed iron ore filter cake.

During this experiment, the source of the filter cake was the same as in example 1, but chemical analyses and fineness of the filter cake was quite different. The chemical analyses of the filter cake was 61.0% Fe, 3.9% $SiO_2$, CaO 3.4% and MgO 1.8%. The filter cake had a moisture of 8.7% and also contained 0.65% carbon. The filter cake had a Blaine number of 1620 $cm^2/g$.

The green balling was carried out in the same manner as described in Example 1. The binder composition the percentage of binder composition and the test results are reported in Table III.

the acid gangue requires extra amount of basic fluxes for neutralizing the slag in the production of fluxed pellets as well as the blast furnace where the slag is maintained at a basicity ($CaO+MgO/SiO_2Al_2O_3$) of more than 1.

EXAMPLE 3

This example is directed to preparation and testing of green, dry and fired pellets using the binder composition F according to the invention. The pellet firing was accomplished according to industrial procedures and the fired pellets were characterized for their metallurgical properties.

A typical Quebec North Shore and Labrador specular hematite concentrate containing approximately 20% magnetite in the form of a filter cake with 8.5% $H_2O$ was used as starting material. The chemical analysis of the filter cake was 66.1% Fe, 4.4% $SiO_2$, 0.44% CaO and 0.27% MgO on a dry basis. The filter cake also contained 0.65% carbon which is a standard practice at most of these operations as an energy saving measure. The filter cake has a Blaine number of 1710 $cm^2/g$.

180 kg of this filter cake was mixed with 1% of solid binder composition of this invention in a Muller ® mixer and batch balled on a 4, balling disc at 18 rpm.

The initial balling disc feed entered the disc on the left side. An adjustable position convenyor belt was used as a feeder. The following procedure was used for the formation of green pellets.

1. 12 kg of the feed without any spray water were fed to the balling disc.
2. By turning on the water sprays seed pellets of approximately 6 mesh size (3.36 mm) were formed. The seed pellets were generally formed in 2-3 minutes.
3. The feed was then added and water addition was adjusted as needed using the sprays. New feed entered the disc near its left side with the spray water slightly to the right and above the new feed point until the majority of the green balls reached a nominal ⅜" (9.5 mm size).
4. Once the green balls reached the above nominal size, the new feed was moved to the right in spaced increments to control ball size.
5. As the load on the disc and balls got larger, the disc angle from the vertical was adjusted in increments beginning at 35° and ending at 40°.
6. The rotating disc created a natural size classifica-

TABLE III

| | | GREEN BALL PROPERTIES | | | | | |
|---|---|---|---|---|---|---|---|
| Binder | % Addition | pellet moisture % wt | Drop number | Wet compr. kg/p | Dry compr. kg/p | Fired compr. kg/p | % Survival at 900° C. |
| F | 0.75 | 10.1 | 33.1 | 1.5 | 5.0 | 422 | 100 |
| F | 1.00 | 9.5 | 36.5 | 1.7 | 6.6 | 391 | 100 |
| D | 1.00 | 9.9 | 33.0 | 1.5 | 9.0 | 410 | 100 |
| C | 1.00 | 10.0 | 29.5 | 1.7 | 8.8 | 343 | 90 |
| Bentonite | 0.75 | 9.2 | 15.3 | 1.5 | 7.0 | 372 | 100 |

This Table shows that the binder composition according to the invention contributes to a very high drop number which is more than twice obtained when a same amount of bentonite was used (i.e. 0.75%), in addition to obtaining similar green, dry and fired compression strength values.

It is of significance to remind that the binder compositions of the invention contain basic flux ingredients resulting in reduced flux consumption whereas bentonite is a contaminant contributing to substantial increase in the acid gangue (i.e. $SiO_2$ and $Al_2O_3$) As aforesaid, tion with the large balls concentrating at lower center region of the disc. The green balls were removed using a small scoop and were saved for testing and subsequent drying and firing.
7. This process was continued until all the feed material was exhausted.

The green pellets were characterized by the tests described before.

A small sample of green pellets were dried overnight in an oven heated at 105° C. following cooling to room temperature, the dry pellet moisture was calculated from the difference in weight of green and dry pellets. The results of the test conducted on green and dry pellets are presented in Table IV.

TABLE IV

| Binder | % Addition | Greenball properties | | |
|---|---|---|---|---|
| | | pellet moisture % wt | drop number | wet compr. kg/p | dry compr. kg/p |
| F | 1 | 8.76 | >25 | 1.55 | 8.77 |

This table clearly demonstrates that the binder composition according to the invention that was tested, is extremely effective in providing very good drop numbers for the pellets. The green compression is equivalent to other types of binders used industrially, and the dry compression strength is excellent.

The green balls obtained from the balling disc were fired in an Allis Chalmer ® pot-grate machine. Each batch of pellets, approximately 80 kg, were fired using an industrial firing cycle used for firing these types of acid pellets. Gas and airflow readings were recorded at one minute interval pellet bed temperatures were monitored at different levels of the bed.

Following firing, the physical and metallurgical quality tests were performed on the pellets. The physical quality included size analysis, crushing or compression strength and tumbler resistance. The metallurgical quality tests included low-temperature disintegration, reducibility, swelling and porosity. The results of the physical quality and metallurgical tests are presented in Table V.

TABLE V

| Binder | % Addition | Fired comp. kg/p | ASTM TUMBLER | | ISO Red, R40 %/min. | ISO STATIC LTD | | ISO swelling % vol. | Porosity % voids |
|---|---|---|---|---|---|---|---|---|---|
| | | | % +6.3 mm | % −0.59 mm | | +6.3 mm | % −0.5 mm | | |
| F | 1 | 278 | 95.6 | 4.3 | 0.77 | 91.5 | 7.5 | 15.6 | 30.5 |

As seen from Table V, the metallurgical properties of the fired pellets are excellent.

EXAMPLE 4

This example highlights the use of the binder compositions E and F according the invention in the production of fluxed pellets and the results of the tests conducted on green, dry and fired pellets.

In this example, the source of iron-bearing material, the preparation and pellet firing procedure were similar to described in example 3, except that the starting pellet feed contained adequate amount of basic flux material (as in example 2), which was used in the commercial production of pellets. The binder compositions, the amounts used and the results of the tests conducted on green, dry and fired pellets are presented in Tables VI and VII.

TABLE VI

| Binder | % addition | Green ball properties | | | |
|---|---|---|---|---|---|
| | | pellet moisture % wt | drop number | wet compr. kg/p | dry comp. kg/p |
| E | 1% | 8.6 | 17.2 | 1.2 | 4.0 |
| F | 1% | 10.0 | 33.4 | 1.7 | 7.8 |

TABLE VII

| Binder | % Addition | Fired comp. kg/p | ASTM TUMBLER | | ISO Red, R40 %/min. | ISO STATIC LTD | | ISO swelling % vol. | Porosity % voids |
|---|---|---|---|---|---|---|---|---|---|
| | | | % +6.3 mm | % −0.59 mm | | % +6.3 mm | % −0.5 mm | | |
| E | 1 | 286 | 97.0 | 2.8 | 1.13 | 95.0 | 5.0 | 9.0 | 31.3 |
| F | 1 | 223 | 96.1 | 3.5 | 1.27 | 96.5 | 3.3 | 18.0 | 33.4 |

These tables clearly demonstrate that in addition to obtaining excellent green ball quality, the binder composition of this invention contributes to an overall improvement in the pellet metallurgical properties as well as a better chemically pure pellet product.

The examples given above are for the purpose of illustration only. Modifications could be made therein by those skilled in the art without departing from the spirit and scope of the invention as defined in the appending claims.

We claim:

1. A self-fluxing clay free binder composition for use in the pelletization of an ore concentrate, comprising in admixture:
   from 50 to 98% by weight of at least one carrier selected from the group consisting of synthetically produced, fibrous forsterite and finely ground natural magnesium and/or calcium bearing minerals natural and synthetic magnesium and/or calcium bearing minerals; and
   from 2 to 50% by weight of at least one water soluble organic enhancer consisting of a natural polysaccharide of high viscosity.

2. The self-fluxing binder composition of claim 1, comprising:
   from 70 to 98% by weight of said at least one carrier; and
   from 2 to 30% by weight of said at least one organic enhancer.

3. The self-fluxing binder composition of claim 2, said ore concentrate is a metal-containing ore
   said ore concentrate is a metal-containing ore concentrate;
   said at least one carrier is selected from the group consisting of synthetically produced, fibrous forsterite having a surface area greater than 15 m$^2$/g and finely ground olivine, magnesite, calcite and dolomite, and
   said at least one organic enhancer is selected from the group consisting of viscous natural gums.

4. The self-fluxing binder composition of claim 3, wherein
   said at least one carrier consists of synthetically produced, fibrous forsterite; and
   said at least one organic enhancer consists of guar gum.

* * * * *